United States Patent Office 3,838,173
Patented Sept. 24, 1974

3,838,173
2-NITRO-5 OR 6 OR 7-METHOXY BENZOFURAN
Rene R. Royer, Pierre G. Demerseman, and Loïc J. Rene, Paris, and Raymond E. Cavier, Villejuif, Val de Marne, France, assignors to Agence Nationale de Valorisation de la Recherche, Paris-Defense Courbevoie, Hauts de Seine, France
No Drawing. Filed June 28, 1971, Ser. No. 157,643
Claims priority, application France, June 29, 1970, 7023984
Int. Cl. C07d 5/42
U.S. Cl. 260—346.2 R                          4 Claims

ABSTRACT OF THE DISCLOSURE

2-Nitrobenzofurans, made by interaction of salicylic aldehydes and halogeno-nitro-methane, have useful therapeutic properties as antimicrobial agents.

---

The present invention relates to the preparation of 2-nitro-benzofuran compounds, more particularly 2-nitrobenzofuran compounds without a substituent in the 3-position.

2-Nitro-benzofuran is known. It has previously been prepared by direct nitration of benzofuran (R. Stvernier and O. Richeter, Ber., 1897, 30, 2094), but only a low yield (5%) is obtained. The present invention makes it possible to produce 2-nitro-benzofuran itself in better yield than by direct nitration of benzofuran.

The invention also provides new 2-nitrobenzofurans possessing valuable properties for human and veterinary therapy.

According to the present invention, 2-nitrobenzofurans without a substituent in the 3-position, are prepared by reacting salicylaldehyde or a salicylaldehyde derivative of the formula:

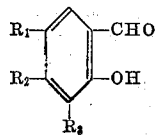

I in which each of the symbols $R_1$, $R_2$ and $R_3$ are the same or different and represent hydrogen, lower alkyl (e.g. alkyl of 1 to 4 carbon atoms), halogen (e.g. chlorine, bromine or iodine) or methoxy, with a halogeno-nitromethane, especially bromo-nitro-methane, in substantially equimolar amount, in an aqueous alkaline medium.

The aqueous medium can be rendered alkaline for example with sodium hydroxide, potassium hydroxide, sodium carbonate or potassium carbonate. The alkaline compound is preferably added in 2 stages, first to dissolve the salicylic compound, and, when this has been brought into contact with the halogeno-nitro-methane, to act as an acceptor of hydrohalic acid, and thereafter as a cyclising agent.

It is for example possible to mix the salicylic compound with sodium hydroxide pellets, in 6 to 8 litres of water per gram molecule of aldehyde used, wait for all the material to dissolve, which can, if necessary, be facilitated by heating to about 40° C., then to add the stoichiometric amount of bromo-nitro-methane, and to heat slowly, with vigorous stirring, until the pH of the solution stabilises at about 6 to 7, which requires from 15 to 35 minutes depending on the particular case. Thereafter, the same amount of sodium hydroxide as at the start is again added, and the mixture is kept at 95–100° C. for 25 to 30 minutes. It is allowed to cool and extracted with benzene, the organic phase is decanted and washed with water, and the solvent is evaporated.

The product remaining after removing the solvent can be purified directly by recrystallisation from an appropriate solvent, such as cyclohexane or toluene. It can also be steam-distilled. In this case, the distillate is purified by recrystallisation, as before.

Instead of carrying out the reaction in an aqueous medium, it is also possible to carry it out in an anhydrous organic diluent, especially in a lower dialkyl ketone, particularly acetone or methyl ethyl ketone, or in dimethylformamide or dioxane, still using the salicylaldehyde and the halogeno-nitro-methane, preferably in a molecular ratio of about 1:2. The alkaline reagent is advantageously employed in the same ratio (about 2:1) relative to the aldehyde.

Thus, for example, the following procedure can be used: The salicylaldehyde and potassium carbonate are mixed in a molar proportion of 1:2, in acetone, using the latter at the rate of about 1.5 litres per gram molecule of the aldehyde. The mixture is heated to gentle boiling under acetone reflux, with stirring, and bromo-nitro-methane is gradually added in an amount corresponding to 2 gram molecules per gram molecule of the aldehyde. Heating with gentle boiling under reflux is continued, with stirring, for 2 hours. The mixture is allowed to cool and the inorganic product is then filtered off. The latter is carefully washed with acetone, which is then added to the acetone solution originating from the reaction. The acetone is removed by evaporation and the product is purified as in the case where the reaction is carried out in an aqueous medium.

The yields of the preparations carried out in this way are much better than those which can be obtained if the process is carried out in aqueous solution. Thus, 69 g. (representing 45%) of 2-nitro-benzofuran are produced by reacting 122 g. of sailcylaldehyde with 140 g. of bromo-nitro-methane in 2000 ml. of acetone containing 138 g. of potassium carbonate.

The products produced by the process of the invention have the formula:

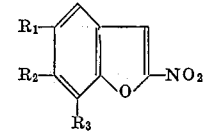

II in which $R_1$, $R_2$ and $R_3$ have the meanings given above.

The Examples which follow illustrate the invention.

EXAMPLE 1

2-Nitro-benzofuran ($R_1 = R_2 = R_3 = H$)

The process is carried out as described above, with 24 g. of salicylaldehyde and 8 g. of sodium hydroxide in 500 cm.³ of water, followed by 28 g. of bromo-nitro-methane, the mixture being treated with a further 8 g. of sodium hydroxide at the appropriate moment. 7 g. (23.5% yield) of the desired compound are thus obtained, m.p. 134° C. in the pure state.

EXAMPLE 2

2-Nitro-5-chloro-6-methyl-benzofuran ($R_1 = Cl$; $R_2 = CH_3$; $R_3 = H$)

17 g. of 4-methyl-5-chloro-salicylaldehyde; 4 g. of sodium hydroxide; 300 cm.³ of water; 14 g. of bromo-nitromethane; and 4 g. of sodium hydroxide are reacted together as described previously. Yellow-ochre micro-crystals (from toluene), m.p. 161° C., are obtained in a yield of 12 g. (57% based on the aldehyde).

EXAMPLE 3

2-Nitro-5-methyl-benzofuran ($R_1=CH_3$; $R_2=R_3=H$)

13.5 g. of 5-methyl-salicylaldehyde; 4 g. of sodium hydroxide; 800 cm.³ of water; 14 g. of bromo-nitro-methane; and 4 g. of sodium hydroxide are reacted together as described previously. Straw yellow flakes (from a mixture of cyclohexane and petroleum ether) are obtained, m.p. 117° C., yield 2.7 g. (15%).

EXAMPLE 4

2-Nitro-5-bromo-6-methyl-benzofuran ($R_1=Br$; $R_2=CH_3$; $R_3=H$)

8.2 g. of 4-methyl-5-bromo-salicylaldehyde; 1.52 g. of sodium hydroxide; 500 cm.³ of water; 5.34 g. of bromo-nitro-methane; and 1.52 g. of sodium hydroxide are reacted as previously described. Yellow-ochre microcrystals (from a mixture of cyclohexane and benzene) are obtained, m.p. 184° C., in a yield of 2 g. (20.5%).

EXAMPLE 5

2-Nitro-6-chloro-benzofuran ($R_1=R_3=H$; $R_2=Cl$)

15.6 g. of 4-chloro-salicylaldehyde; 4 g. of sodium hydroxide; 800 cm.³ of water; 14 g. of bromo-nitro-methane; and 4 g. of sodium hydroxide are reacted together as described previously. Yellow flakes (from a mixture of cyclohexane and petroleum ether), m.p. 105° C., are obtained in a yield of 3.5 g. (17.5%).

EXAMPLE 6

2-Nitro-7-methoxy-benzofuran ($R_1=R_2=H$, $R_3=OCH_3$)

15.2 g. of ortho-vanillin; 4 g. of sodium hydroxide; 700 cm.³ of water; 14 g. of bromo-nitro-methane, and 4 g. of sodium hydroxide are reacted together as described previously. Golden yellow prisms (from cyclohexane), m.p. 128° C., are obtained in a yield of 2.2 g. (12%).

EXAMPLE 7

2-Nitro-5-bromo-benzofuran ($R_1=Br$; $R_2=R_3=H$)

20 g. of 5-bromo-salicylaldehyde; 4 g. of sodium hydroxide; 800 cm.³ of water; 14 g. of bromo-nitro-methane; and 4 g. of sodium hydroxide are reacted together as described previously. Pale yellow needles (from cyclohexane), m.p. 163° C., are obtained in a yield of 3 g. (12.5%).

EXAMPLE 8

2-Nitro-5-chloro-benzofuran ($R_1=Cl$; $R_2=R_3=H$)

15.6 g. of 5-chloro-salicylaldehyde; 4 g. of sodium hydroxide; 700 cm.³ of water; 14 g. of bromo-nitro-methane; and 4 g. of sodium hydroxide are reacted together as described previously. Yellow needles (from cyclohexane), m.p. 140.5° C. are obtained in a yield of 1.3 g. (6.5%).

EXAMPLE 9

2-Nitro-5-methoxy-benzofuran ($R_1=OCH_3$; $R_2=R_3=H$)

15.2 g. of 5-methoxy-salicylaldehyde; 4 g. of sodium hydroxide; 800 cm.³ of water; 14 g. of bromo-nitro-methane; and 4 g. of sodium hydroxide, are reacted together as described above. Yellow flakes (from cyclohexane) are obtained, m.p. 127.5° C. in a yield of 2.2 g. (12%).

EXAMPLE 10

2-Nitro-6-methoxy-benzofuran ($R_1=R_3=H$; $R_2=OCH_3$)

The procedure followed is as described above using an organic medium with 45 g. of 4-methoxy-salicylaldehyde; 50 g. of bromo-nitro-methane; 84 g. of potassium carbonate; and 500 ml. of acetone. After recrystallisation from cyclohexane, 19 g. (33% yield, based on the aldehyde) of yellow needles, m.p. 129° C., are obtained.

The compounds of formula II above, where $R_1$, $R_2$ and $R_3$ do not all three represent hydrogen, are new compounds and as such form part of the invention. Preferred such compounds are 5 - chloro-6-methyl-2-nitro-benzofuran, 5-methyl-2-nitro-benzofuran, 5-bromo-6-methyl-2-nitro-benzofuran, 6-chloro-2-nitro-benzofuran, 7-methoxy-2-nitro-benzofuran, 5-methoxy-2-nitro-benzofuran, 5- bromo - 2-nitro-benzofuran, 5-chloro-2-nitro-benzofuran and 2-nitro-6-methoxy-benzofuran.

These compounds show activity against microorganisms and parasites and can therefore be used as disinfectants and, in therapy, as parasiticides, bactericides, bacteriostatic agents and fungicides.

The compounds of the present invention have very low toxicity. It has not been possible, therefore, to determine the maximum tolerated dose but it is greater than 1350 mg./kg.

They act, in particular, against *Trichomonas vaginalis* and *Entamoeba dysenteriae*, as well as against colibacilli, staphylococci and pathogenic fungi and, in the case of some of them, against Koch bacillus.

The anti-bacterial activity has been evaluated in vitro by determining the minimum inhibitory bacteriostatic concentration (M.I.C.) in a liquid nutrient medium after being left for 18 hours at 37° C. For *Mycobacterium tuberculosis* the period at 37° C. is extended to one week. The culture media were ordinary nutrient broth and Dubos medium for *M tuberculosis*.

The antimycosis activity was determined first in a solid nutrient medium (Sabouraud agar for a strain of *Aspergillus*, and secondly in a liquid nutrient medium (Sabouraud medium) for a strain of yeast (*Saccharomyces cerevisiae*.) The results were noted after a period of 72 hours at 28° C., for the *Aspergillus* and of 18 hours at 37° C., for the yeast.

The nutrient media were placed in haemolysis tubes at the rate of 1.8 ml. per tube in the case of the bacteria and the yeasts, and in test tubes of 22 mm. diameter at the rate of 4.5 ml. per tube, for *M. tuberculosis*.

Solutions of the nitrobenzofuran compounds, of decreasing concentrations, prepared by the method of series dilutions, were added in an amount of 0.2 ml. to the tubes containing 1.8 ml. and of 0.5 ml. to the tubes containing 4.5 ml.

The inoculum consisted of a drop of a mother culture which had been aged for 18 hours at 37° C. in a liquid medium, after dilution until a very slightly turbid suspension (about $10^5$ bacteria per ml.) was obtained. For *M. tuberculosis*, the inoculum was a drop of a homogeneous culture in Dubos medium.

For the *Aspergillus*, the solutions of the compounds tested were added to the Sabouraud agar at the rate of 2 ml. of solution per 18 ml. of liquefied agar, before being run into a Petri dish. The inoculum consisted of a small fragment of a 72 hours' old culture.

The final concentrations of the substances tested are low in view of their very low solubility. Their solution in acetone is diluted with water so as not to exceed a final acetone concentration in the nutrient medium of 1/20 in the case of the bacteria and fungi and of 1/40 in the case of *M. tuberculosis*, these concentrations being compatible with the normal growth of the microorganisms.

The results obtained for the compounds studied are shown in Table I below. They are expressed as the minimum inhibitory concentration (M.I.C.) in μg./ml. of nutrient medium.

TABLE I

|  | 2 | 3 | 4 | 5 | 6 | 9 | 10 |
|---|---|---|---|---|---|---|---|
| Bacteria: | | | | | | | |
| *Staphylococcus aureus* (GramH) | 1 | 10 | 1.4 | 16.6 | 1.4 | 1 | 20 |
| *Escherichia coli* 548 (Gram—) | 5 | 5 | a>100 | 10 | 1 | 1.6 | 2 |
| Koch bacillus *Mycobacterium tuberculosis* | a>100 | a>100 | 10 | 10 | 10 | 1 | 5 |
| Fungi: | | | | | | | |
| *Aspergillus niger* | 16.6 | 25 | a>100 | 10 | a>100 | 3.3 | 10 |
| *Saccharomyces cerevisiae* | 50 | 11 | a>100 | 10 | a>100 | 10 | 8 | a Inactive.

Two types of parasiticidal action have been studied.

1. Trichomonacidal action

In order to determine the trichomonacidal activity *in vitro* on *Trichomonas vaginalis*, the inhibition at the start of the cultures is measured. The culture medium (called Magara medium) consists of a beef and beef liver broth of commercial origin (VF broth or Weinberg and Goy medium, supplied by the Institut Pasteur) for anaerobic organisms, with the addition of 0.5% of glucose and 5 to 10% of sterile colt serum. 9 ml. of this medium are inoculated with 0.5 ml. of a culture of *Trichomonas vaginalis*, corresponding to 400,000 flagellates and are treated, at the same time, with 0.5 ml. of an aqueous solution or suspension of the product to be examined. The activity displayed is given by the minimum concentration of substance which totally inhibits the development of *Trichomonas vaginalis* after a contact time of 48 hours in an oven at 37° C.

2. Amoebicidal action

The amoebicidal activity tests *in vitro* against *Entamoeba dysenteriae* were carried out in the same manner as the tests against *Trichomonas vaginalis*, but the medium used is the Pavlova-Jones medium, the composition of which is given below:

| | |
|---|---|
| $Na_2HPO_4 \cdot 2H_2O$ _____ g__ | 4.45 |
| $K_2HPO_4$ _____ g__ | 1.135 |
| NaCl _____ g__ | 20 |
| Difco yeast extract _____ g__ | 2.75 |
| Distilled water _____ ml__ | 2,750 |

The inhibiting action at the start of the culture is recorded after 72 hours in an oven at 37° C. It is expressed in μg./ml. The results are given in the Table below.

TABLE II

| Product of Example No. | *Trichomonas vaginalis* | *Entamoeba dysenteriae* |
|---|---|---|
| 2 | 1.25 | 100 |
| 3 | 2.5–5 | 100 |
| 4 | 1.25–2.5 | 100 |
| 5 | 1.25 | 50–100 |
| 6 | 1.25 | 100 |
| 7 | 1.25 | 2.5 |
| 8 | 0.6 | 5 |
| 9 | 1 | 5 |
| 10 | 2 | 10 |

The compounds studied, in particular the products of Example Nos. 6, 8, 9 and 5 can be used in therapy for the treatment of urethritis and vaginitis caused by Trichomonas, and of intestinal or hepatic amebiasis. They can also be employed in combatting coli-bacilli and pathogenic staphylococci as well as combatting tuberculosis.

In particular the product of Example 6 easily passes through the intestinal barrier and can be recovered unchanged from the urine. In consequence, this compound shows a very interesting anticolibacillus effect when administered orally.

The compounds can be presented, for example, as tablets containing from 5 to 800 mg., as pills, in suppositories or as an ointment. The daily dosage can be from 10 to 50 mg./kg.

We claim:
1. A benzofuran of the formula

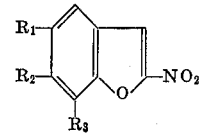

in which $R_1$, $R_2$ and $R_3$ are each hydrogen, or methoxy, with the proviso that there is one methoxy group per benzofuran.

2. 2-Nitro-5-methoxy-benzofuran.
3. 2-Nitro-6-methoxy-benzofuran.
4. 2-Nitro-7-methoxy-benzofuran.

References Cited

Royer, Demerseman and René, Bulletin de la Société Chimique de France (1970) No. 10, p. 3740–1.

HENRY R. JILES, Primary Examiner

B. DENTZ, Assistant Examiner

U.S. Cl. X.R.

260—600; 424—285

UNITED STATES PATENT AND TRADEMARK OFFICE
CERTIFICATE OF CORRECTION

PATENT NO. : 3,838,173
DATED : September 24, 1974
INVENTOR(S) : Rene R. Royer et al It is certified that error appears in the above-identified patent and that said Letters Patent are hereby corrected as shown below:

Please note in the Claim for Priority, the second French priority application has been omitted and should be inserted as follows:

France, Patent Appln. No. 71 09707 filed March 19, 1971

Signed and Sealed this second Day of March 1976

[SEAL]

Attest:

RUTH C. MASON
Attesting Officer

C. MARSHALL DANN
Commissioner of Patents and Trademarks